United States Patent
Wandrie, III et al.

(10) Patent No.: US 9,216,474 B2
(45) Date of Patent: Dec. 22, 2015

(54) TWO-PIECE FRICTION-WELDED PISTON

(75) Inventors: Henry Maurice Wandrie, III, Irvine, CA (US); Richard Allen Grishaber, Long Beach, CA (US); Steven Robert Scott, The Woodlands, TX (US); John Hamilton Brooks, Long Beach, CA (US); Robert Pill, San Pedro, CA (US); Benjamin Monroy, Carson, CA (US); Albert Antoun Shehata, Hawthorne, CA (US)

(73) Assignee: Industrial Parts Depot, LLC, Torrance, CA (US)

( * ) Notice: Subject to any disclaimer, the term of this patent is extended or adjusted under 35 U.S.C. 154(b) by 0 days.

(21) Appl. No.: 13/454,517

(22) Filed: Apr. 24, 2012

(65) Prior Publication Data
US 2013/0276740 A1 Oct. 24, 2013

(51) Int. Cl.
| | |
|---|---|
| *F02F 3/00* | (2006.01) |
| *B23K 20/12* | (2006.01) |
| *F02F 3/22* | (2006.01) |
| *F02B 3/06* | (2006.01) |

(52) U.S. Cl.
CPC .............. *B23K 20/129* (2013.01); *F02F 3/22* (2013.01); *B23K 2203/06* (2013.01); *F02B 3/06* (2013.01); *F02F 3/00* (2013.01); *F02F 2003/0061* (2013.01); *F05C 2201/021* (2013.01)

(58) Field of Classification Search
CPC .............. F05C 2201/021; F05C 2201/0048; F02F 3/22; F02F 3/00; F02B 3/06
USPC .................................................... 123/193.6
See application file for complete search history.

(56) References Cited

U.S. PATENT DOCUMENTS

| | | | | |
|---|---|---|---|---|
| 2,201,037 | A | * 5/1940 | Hagemeyer | 106/38.3 |
| 3,805,677 | A | * 4/1974 | Clary et al. | 92/186 |
| 4,013,057 | A | * 3/1977 | Guenther | 123/193.6 |
| 4,989,559 | A | * 2/1991 | Fletcher-Jones | 123/193.6 |
| 5,113,817 | A | * 5/1992 | Kemnitz et al. | 123/193.6 |
| 5,245,752 | A | 9/1993 | Lippai et al. | |
| 5,588,351 | A | 12/1996 | Lippai et al. | |
| 5,894,824 | A | * 4/1999 | Watanabe et al. | 123/193.6 |
| 6,112,642 | A | 9/2000 | Jarrett et al. | |
| 6,155,157 | A | 12/2000 | Jarrett | |
| 6,279,455 | B1 | 8/2001 | Kruse | |
| 6,318,243 | B1 | 11/2001 | Jones | |
| 6,491,013 | B1 | 12/2002 | Gaiser et al. | |

(Continued)

FOREIGN PATENT DOCUMENTS

| | | |
|---|---|---|
| EP | 0 992 670 A2 | 4/2000 |
| EP | 1 222 364 B1 | 6/2006 |

*Primary Examiner* — Lindsay Low
*Assistant Examiner* — Charles Brauch
(74) *Attorney, Agent, or Firm* — Wegman, Hessler & Vanderburg

(57) ABSTRACT

A two-piece piston is formed by friction welding an upper member to a lower member, wherein the upper and lower members are precision cast to net final dimensions such that no post-casting machining is required prior to the friction-welding process. The upper member includes a substantially flat crown and combustion surface extending radially inward from the crown. The lower member includes a pair of opposing skirts, each having a bore formed therethrough for receiving a connecting rod pin. The upper member and lower member each include at least two corresponding connecting surfaces that form a welded joint therebetween when the upper and lower members are friction welded together. The finished piston includes an integral cooling oil reservoir adjacent to the combustion surface.

20 Claims, 10 Drawing Sheets

(56) References Cited

U.S. PATENT DOCUMENTS

| | | |
|---|---|---|
| 6,499,387 B2 | 12/2002 | Bedwell |
| 6,684,844 B1 * | 2/2004 | Wang et al. ............... 123/193.1 |
| 6,840,155 B2 * | 1/2005 | Ribeiro et al. ............... 92/186 |
| 7,005,620 B2 | 2/2006 | Ribeiro et al. |
| 7,080,610 B2 * | 7/2006 | Bauer et al. ............... 123/41.35 |
| 7,654,240 B2 | 2/2010 | Jarrett et al. |
| 7,870,669 B2 * | 1/2011 | Ribeiro et al. ............ 29/888.05 |
| 7,938,093 B2 | 5/2011 | Rasmussen |
| 8,286,852 B2 | 10/2012 | Kolbe et al. |
| 8,434,400 B2 | 5/2013 | Kemnitz et al. |
| 8,528,513 B2 | 9/2013 | Haug et al. |
| 8,789,273 B2 | 7/2014 | Janssen et al. |
| 8,807,109 B2 | 8/2014 | Muscas et al. |
| 2001/0025568 A1 | 10/2001 | Kemnitz et al. |
| 2005/0092739 A1 * | 5/2005 | Ribeiro et al. ............... 219/635 |
| 2006/0207424 A1 * | 9/2006 | Gaiser ............... 92/222 |
| 2011/0185992 A1 | 8/2011 | Gniesmer |

* cited by examiner

TWO-PIECE FRICTION-WELDED PISTON

FIELD OF THE INVENTION

The present invention is directed to a piston for use in diesel and other internal combustion engines, and more particularly, a two-piece friction-welded piston.

BACKGROUND OF THE INVENTION

Present diesel and other high performance internal combustion engines are being operated at extremely high combustion pressures and temperatures. For example, many on and off road diesel applications operate, with diesel fuel injection at pressures in excess of 30,000 psi and exhaust gas turbo-charging which can create intake manifold pressures in excess of 50 psi. In addition, government mandated exhaust emission standards in developed countries and markets including, but not limited to, the United States, Japan, and the EEC require both strict control of the combustion processes and strict control of emissions in service as well as specific performance and emissions control longevity of the engines during on-road, off-road, and marine applications.

Presently known piston designs, which are commercially practiced, do not adequately address several extremely critical aspects of piston manufacturing and performance. For example, current piston designs struggle to obtain proper dimensional attributes to generally maintain required operational and long-term durable performance of the piston to cylinder bore sealing rings at presently required operating temperatures and pressures as well as minimizing combustion gas blow-by and resultant increased exhaust emissions without costly and extensive machining operations and other additional manufacturing steps. Additionally, current piston designs have problems incorporating an integral reservoir for cooling oil into the piston crown area with adequate volume and highly consistent piston-to-piston volume without the incorporation of separate sealing dams or rings that are mechanically attached to the piston in various manners, all of which require additional machining and manufacturing steps to prepare the piston to accept the separate sealing dams or rings, the inserting and fixing of the sealing rings in the manufacturing process, and the separate manufacture of the sealing dams or rings themselves. Further, current piston designs also have problems with the mechanical failure of the cooling oil reservoir dams or rings and/or the failure of the fixing means of such devices to the piston, causing physical separation from the piston and the resulting loss of cooling oil in one or more pistons and introduction of foreign materials into the interior of the engine and subsequent severe engine damage or failure.

The absence of adequate mechanical support of the piston to cylinder bore sealing ring area of typical pistons including, but not limited to, the flexure of the lower parts of the sealing ring areas often results in cracking and failure of the areas of the piston that incorporate the sealing rings and result in severe engine damage or failure. Also, the absence of adequate mechanical support of the sealing ring area of typical pistons results in the reduction and/or loss of sealing ring performance that causes gas blow-by, which leads to lubricating oil infiltration into the combustion chamber and therefore increased exhaust emissions and/or the mechanical failure of the sealing rings and severe engine damage or failure.

It is also known in the art to friction weld two or more parts of a piston together to permit various configurations to be made that would otherwise be commercially impractical or impossible. Typical two-piece pistons consist of a steel forged crown and a separate skirt, usually forged of the same or a compatible steel alloy which guides the piston assembly in the combustion cylinder of an engine. Prior to friction welding the crown and skirt, the crown typically undergoes extensive and costly machining operations, which includes incorporating one or more circumferentially disposed recesses that are configured to accept sealing rings. Also prior to friction welding the crown and skirt, the skirt is typically machined to provide opposing, axially-aligned bores that are configured to accept a steel pin which joins the piston with a connecting rod. This known piston design is configured to provide a heat and pressure resistant steel crown incorporating the sealing rings and an attached lower member comprised of the skirt. The separate pieces presently start out in as-forged or as/rough-cast condition and subsequently machined, machined from a solid block, or otherwise rough formed prior to joining by way of friction or inertia welding. However, in each of these processes for producing a piston, precision machining the joining or connecting surfaces that are to be welded together is a required prior step/operation to the friction welding process.

Known two-piece friction welded pistons also incorporate a cooling oil reservoir which can consist of a recess in the piston crown and/or separate reservoirs in the skirt. Alternatively, a reservoir is formed in the crown and is closed off with a plate assembly, wherein each of the reservoirs communicate with oil spray jets located in the engine block to introduce cooling oil to the underside of the piston crown to reduce the operating temperature of the crown and thus prolong piston life and ensure proper operation of the piston to cylinder bore sealing rings.

Such pistons as described above tend to be very heavy and their configurations are limited by the need to join three separate parts to form a complete piston: (1) the steel crown and sealing ring groove section, (2) the skirt section by friction welding and (3) the machining of a receptacle for and the mechanical insertion of an oil dam or plate. Similarly, such piston designs often require multiple methods of forming a cooling oil reservoir/gallery including machining and the mechanical insertion of dams or plates to form such reservoirs.

The incorporation of cooling oil reservoirs or galleries in a piston is also commonly known. This is typically done with the employment of separate dams or plates of various materials which are inserted and fixed beneath the crown area. Alternatively, such reservoirs may also be partially incorporated in one or more of the two-piece friction welded pistons by machining such reservoirs in rough castings or rough forgings prior to joining them in a friction welding process.

Other known piston designs are made of rough cast or as-rough forged as one-piece configurations. However, these designs have several disadvantages including the requirement of extensive post-forging or post-casting machining, the absence of a closed oil gallery formed integrally with the crown, and the absence of lateral/axial support of the lower portion of the sealing ring carrying portion of the piston crown. These design and manufacturing limitations result in requiring a separate oil dam inserted in the crown and the absence of axial and radial support to prevent flexure of the sealing ring portion of the piston. This lack of axial and radial support is known to cause premature flexure failures of the piston crown and the degradation of the piston to cylinder bore sealing ring performance during the service life of the piston which can increase the exhaust emissions of an engine so equipped and can result severe engine damage or failure thereof. The flexure of the lower part of the piston which contains the piston to cylinder bore sealing ring grooves leads to the loss of long-term complete sealing between the piston and the cylinder bore seating rings which, in turn, results in higher oil consumption, combustion blow-by, higher operating temperatures, reduction in service life and increased exhaust emissions which can render the operation of the engine unlawful under certain rules and regulations.

Accordingly, there is a need for a piston that eliminates additional post-casting machining that incorporates and/or affixes separate oil reservoir sealing dams. There is also a need for eliminating post-casting machining of contact or joining surfaces prior to a spin or friction welding process for joining at least two separate pieces of a piston.

BRIEF SUMMARY OF THE INVENTION

According to one aspect of the present invention, a piston for use in an internal combustion engine is provided. The piston includes an upper member, wherein the upper member is precision cast to net final dimensions. The upper member includes a crown and a combustion surface extending radially inward from the crown. The upper member further including a first upper connecting surface and a second upper connecting surface, wherein the first and second upper connecting surfaces are concentrically oriented. The piston also includes a lower member, wherein the lower member is precision cast to net final dimensions. The lower member has a pair of opposing skirts, each skirt having a bore formed therethrough. The lower member further includes a first lower connecting surface and a second lower connecting surface, wherein the first and second lower connecting surfaces are concentrically oriented. The lower member is integrally connected to the upper member by friction welding such that the first upper connecting surface and the first lower connecting surface form a first welded joint therebetween and the second upper connecting surface and the second lower connecting surface form a second welded joint therebetween.

According to another aspect of the present invention, a piston for use in an internal combustion engine is provided. The piston includes an upper member, the upper member being precision cast to net final dimensions. The upper member has a combustion surface and at least two concentrically positioned upper connecting surfaces spaced apart from the combustion surface. The piston also includes a lower member, the lower member being precision cast to net final dimensions. The lower member has a pair of bores formed therethrough for receiving a connecting rod pin, and the lower member has at least two concentrically positioned lower connecting surfaces. The lower member is attached to the upper member by way of friction welding such that each upper connecting surface of the upper member forms a welded joint with one of the lower connecting surfaces.

According to yet another aspect of the present invention, a method of manufacturing a piston is provided. The method includes precision casting to net final dimensions an upper member, wherein the upper member includes a combustion surface and at least two upper connecting surfaces concentrically arranged and spaced apart from the combustion surface. The method also includes precision casting to net final dimensions a lower member, wherein the lower member includes a pair of opposing skirts having a bore formed through each of the skirts. The lower member also includes at least two lower connecting surfaces concentrically arranged. The method further includes friction welding the lower member to the upper member, wherein a welded joint is formed between each of the upper connecting surfaces of the upper member and a corresponding lower connecting surface of the lower member.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
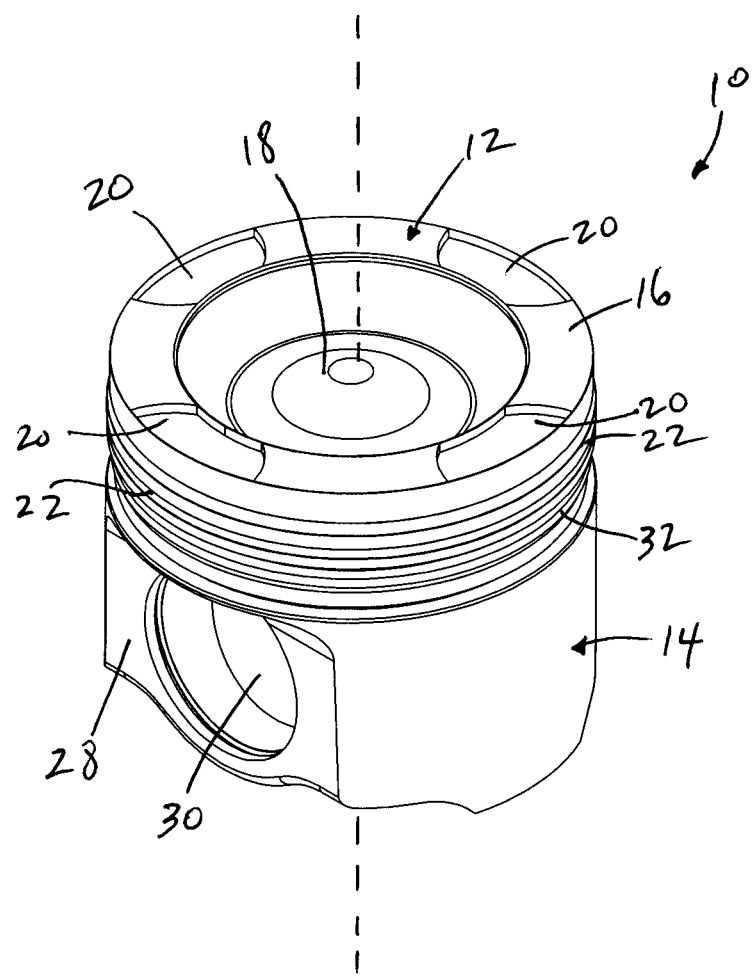
FIG. 1 is a top perspective of an embodiment of a completed two-piece friction-welded piston of the present invention.
Figure 2:
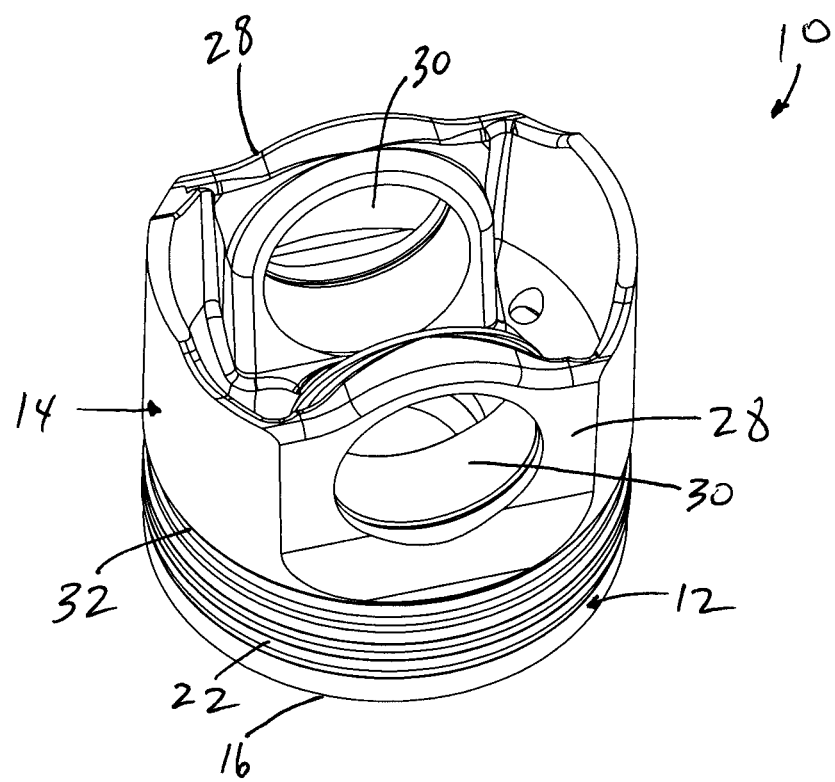
FIG. 2 is a bottom perspective of the piston shown in FIG. 1.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

With reference to FIGS. 1-4, an embodiment of a two-piece friction-welded piston 10 is shown, wherein the piston 10 includes an upper member 12 and a lower member 14. The upper member 12 of the piston 10 is a generally cylindrical member that forms the upper portion of the piston 10. The piston 10 is positioned such that the upper member 12 forms the lower boundary of a combustion chamber within each combustion chamber of each cylinder of an engine. The upper member 12 includes a substantially flat crown 16 having a central recess 18, or combustion surface, extending radially inward therefrom. In an embodiment, the upper member 12 includes at least one detent 20 formed into the crown 16 to prevent contact between the crown 16 and the combustion air intake and exhaust valves (not shown) during operation. In the illustrated embodiment shown in FIG. 1, the crown 16 includes four (4) detents 20 formed therein, but it should be understood by one of ordinary skill in the art that any number of detents 20 can be formed into the crown 16 to prevent contact between the crown 16 and the exhaust or air intake valves. The upper member 12 further includes at least one circumferential groove 22 formed about the outer cylindrical surface thereof, wherein each of the grooves 22 is configured to receive a piston to cylinder bore sealing ring (not shown). In the illustrated embodiment, the upper member 12 includes three (3) grooves 22 formed into the outer circumferential surface thereof. However, it should be understood by one of ordinary skill in the art that any number of grooves 22 can be formed into the outer circumferential surface of the upper member 12.

Figure 3:
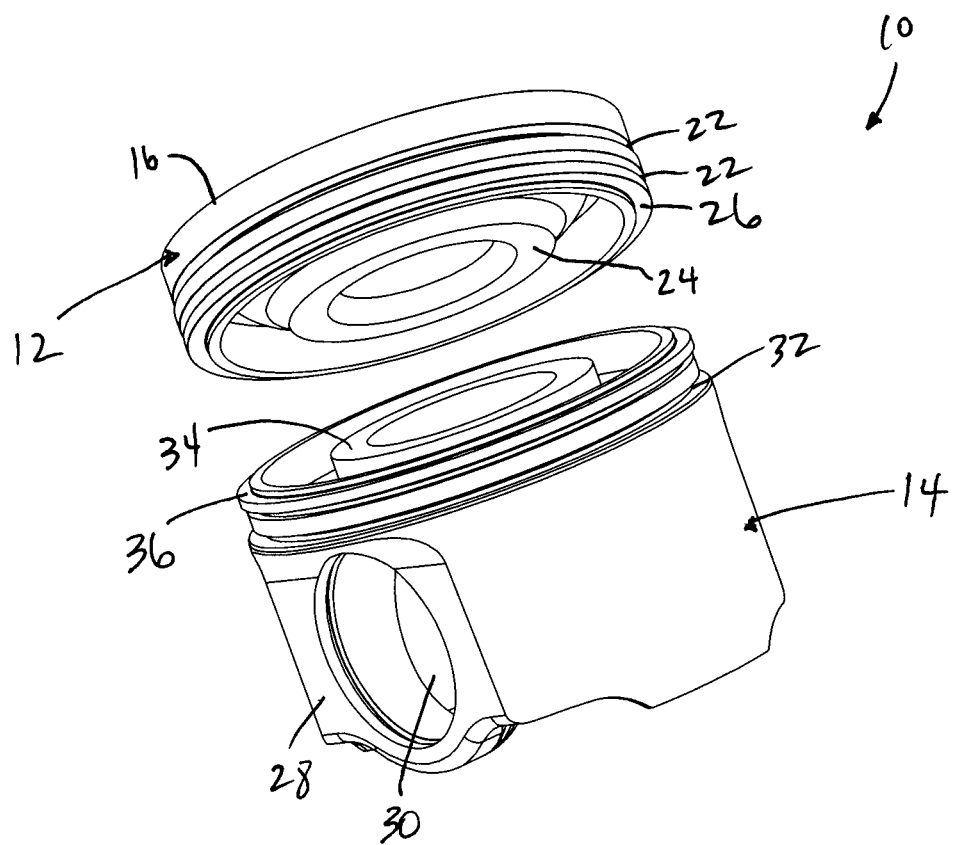
FIG. 3 is an oblique perspective view of an embodiment of upper and lower pieces of a two-piece friction-welded piston prior to joining by friction welding.
Figure 4:
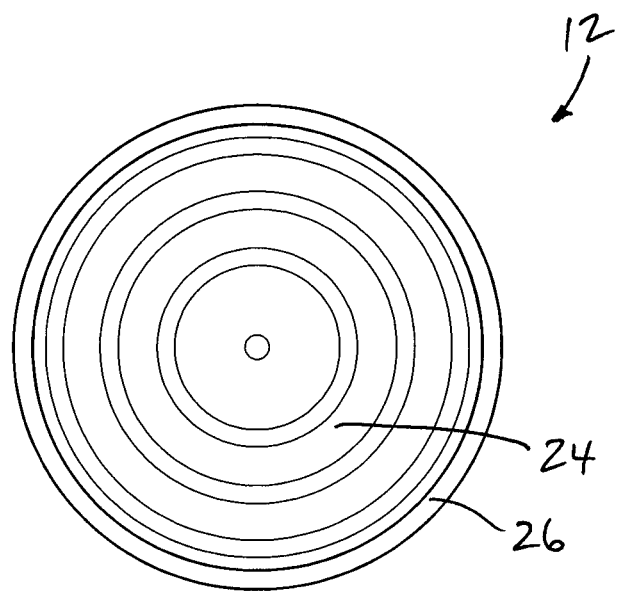
FIG. 4 is a bottom view of an embodiment of the upper piece of a two-piece friction-welded piston.

As shown in FIGS. 3-4, the upper member 12 includes a first upper connecting surface 24 and a second upper connecting surface 26 formed on the downwardly-directed portion thereof. The first and second upper connecting surfaces 24, 26 are substantially concentrically aligned, wherein the first upper connecting surface 24 is positioned radially inward relative to the second upper connecting surface 26 of the piston 10. Although the illustrated embodiment of the piston 10 will be explained below as having two connecting surfaces on the upper member that mate with and correspond to two connecting surfaces on the lower member by which the upper and lower members 12, 14 are joined together via friction welding, it should be understood by one of ordinary skill in the art that the upper and lower members 12, 14 can be configured to include any number of corresponding connecting surfaces for connecting the upper member 12 to the lower member 14. In an embodiment, the first and second upper connecting surfaces 24, 26 are oriented substantially parallel and are coplanar. In another embodiment, at least one of the first or second upper connecting surfaces 24, 26 are parallel with respect to the crown 16 of the upper member 12 but are non-coplanar.

As shown in FIGS. 1-3 and 5, the lower member 14 extends downwardly from the upper member 12. The lower member 14 is configured to receive a connecting rod pin (not shown) for allowing the piston 10 to be operatively connected to a connecting rod that translates the piston 10 within the combustion cylinder of an engine. In an embodiment, the lower member 14 is generally cylindrical that has a truncated outer surface that forms a pair of opposing skirts 28. The skirts 28 are formed as substantially horizontally arcuate portions of the outer surface of the lower member 14, and the skirts 28 are substantially aligned in a parallel manner. Each skirt 28 includes a bore 30 formed therethrough, and the skirt bores 30 are configured to receive a connecting rod pin (not shown) for operatively connecting the connecting rod to the piston 10. The portions of the lower member 14 cylindrically extending between each of the opposing skirts 28 form the outer boundary of an integral cooling reservoir 31.

Figure 5:
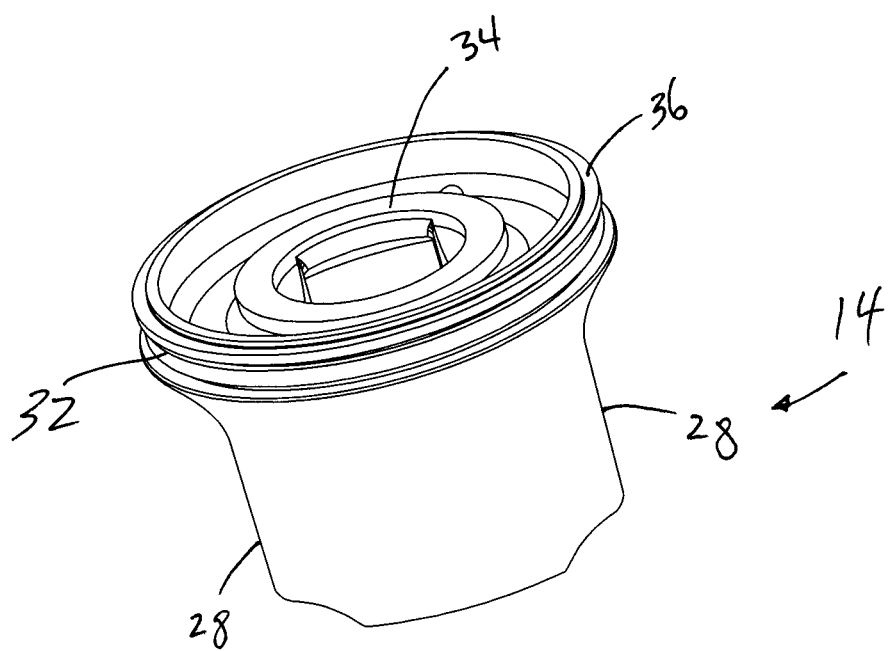
FIG. 5 is an oblique perspective view of the lower piece of the piston shown in FIG. 1.
Figure 6:
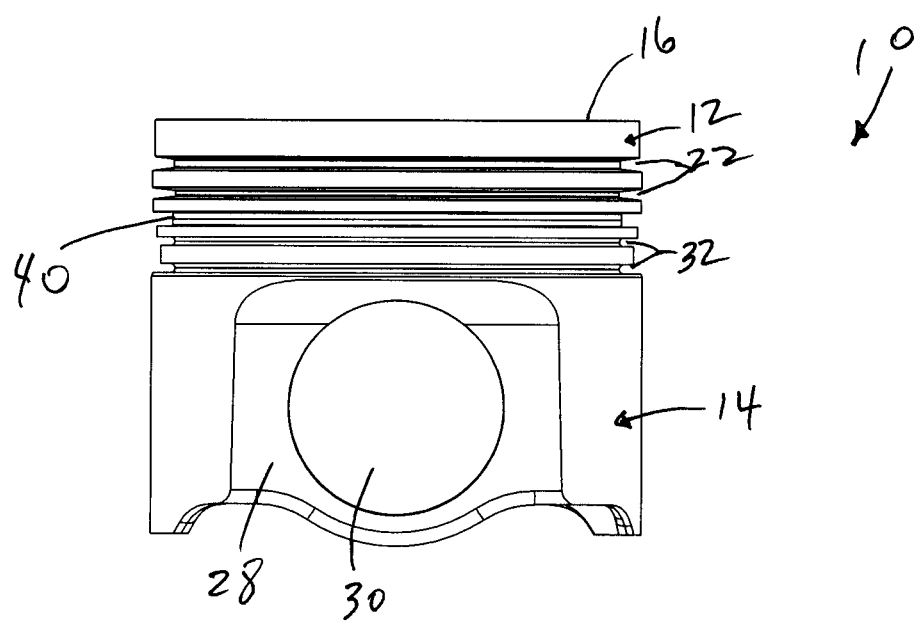
FIG. 6 is a side view of the piston shown in FIG. 1 oriented at 90° relative to the view shown in FIG. 5.
Figure 7:
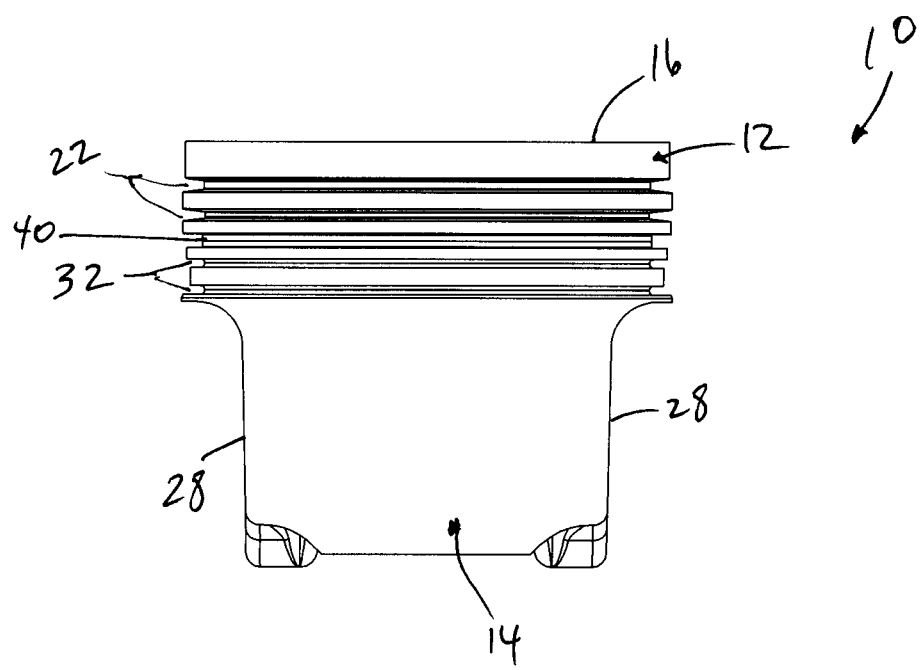
FIG. 7 is a side view of the piston shown in FIG. 1, oriented at 90 (deg) relative to the view shown in FIG. 6.
Figure 8:
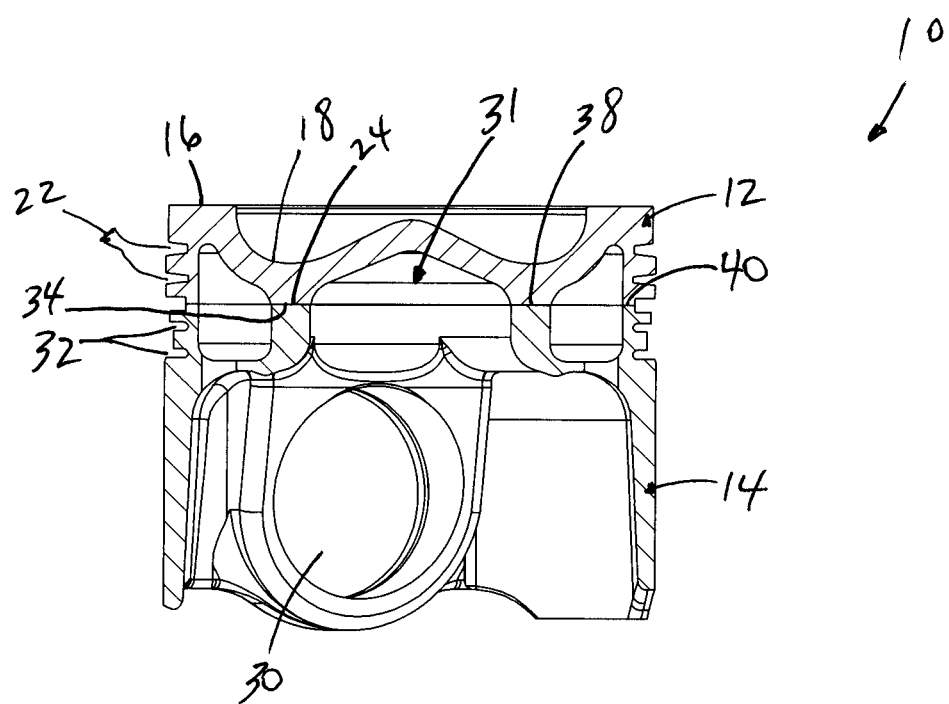
FIG. 8 is an oblique cross-sectional view of the completed piston as shown in FIG. 1, taken along the line A-A in FIG. 7.
Figure 9:
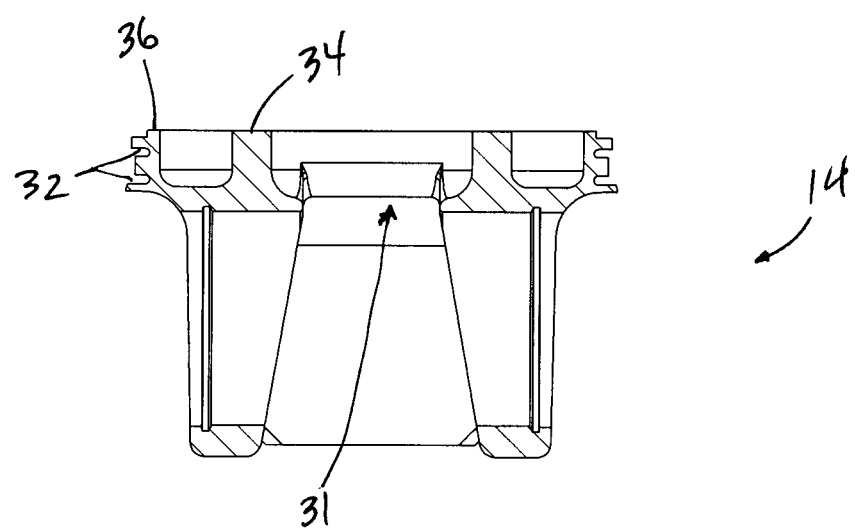
FIG. 9 is a cross sectional view of the bottom piece of a two-piece friction-welded piston.

The lower member 14 also includes at least one groove 32 formed into the circumferential outer surface thereof, as shown in FIGS. 1-3 and 5. In the illustrated exemplary embodiment, the lower member 14 includes two (2) circumferential grooves 32 formed therein. In an embodiment, the lower member 14 includes a first lower connecting surface 34 and a second lower connecting surface 36 formed on the upwardly-directed portion thereof, as shown in FIGS. 3 and 5. The first and second lower connecting surfaces 34, 36 are substantially concentrically aligned, wherein the first lower connecting surface 34 is positioned radially inward relative to the second lower connecting surface 26 of the lower member 14. In an embodiment, the first and second lower connecting surfaces 34, 36 are oriented substantially parallel relative to each other as well as transversely aligned relative to the axial centerline of the piston 10. In another embodiment, at least one of the first or second lower connecting surfaces 34, 36 is non-transversely aligned with respect to the axial centerline of the piston 10. In yet another embodiment, both of the first and second lower connecting surfaces 34, 36 are oriented in a non-transverse manner with respect to the axial centerline of the piston 10.

Figure 10:
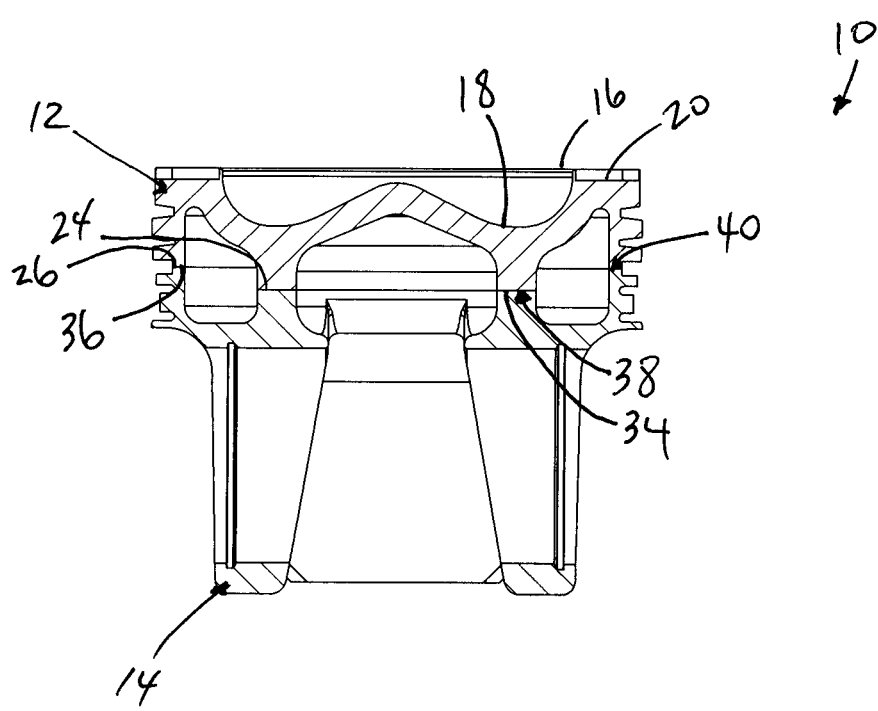
FIG. 10 is a cross-sectional view of the piston shown in FIG. 1, taken along the line B-B in FIG. 6.

In a first exemplary embodiment, as shown in FIGS. 6-9, the upper and lower members 12, 14 of the piston 10 are configured such that the first and second upper connecting surfaces 24, 26 are coplanar and the first and second lower connecting surfaces 34, 36 are similarly coplanar. As such, when the upper member 12 is connected to the lower member 14, the resulting joints between the upper and lower member 12, 14 are likewise substantially coplanar. In another exemplary embodiment, as shown in FIG. 10, the first upper connecting surface 24 is positioned a greater distance away from the crown 16 than the second upper connecting surface 26 such that the first and second upper connecting surfaces 24, 26 are non-coplanar. In a like manner, the first lower connecting surface 34 is offset from the second lower connecting surface 36 the same relative distance that the first and second upper connecting surfaces 24, 26 are offset. Although the embodiment illustrated in FIG. 10 shows that the first upper connecting surface 24 is spaced apart from the crown 16 a greater distance than the second upper connecting surface 26, it should be understood by one of ordinary skill in the art that the first upper connecting surface 24 can also be spaced apart from the crown 16 a smaller distance than the second upper connecting surface 26. The same relative spacing and offsets apply equally to the first and second lower connecting surfaces 34, 36 in a corresponding manner to ensure coincident contact between the upper and lower connecting surfaces during a friction-welding process.

The upper and lower members 12, 14 are formed separately and later joined together to form the complete piston 10. In an embodiment, the upper and lower members 12, 14 are formed using steel, other ferrous material or other high temperature/high strength metals such as titanium, Monel, Inconel, or similar. The material used for the upper and lower members should be of adequate strength and have sufficient heat resistance to impart the needed strength for use in a diesel or other internal combustion engine. The upper and lower members 12, 14 are both precision cast to net final dimensions. Precision cast to net final dimensions generally means that the final casted piece does not require additional machining to any of the upper connecting surfaces 24, 26 or lower connecting surfaces 34, 36 prior to joining the upper and lower members 12, 14 in a friction or inertial welding process. Also, by precision casting to net final dimensions, additional machining to form the surfaces of the integral cooling oil reservoir is eliminated. In an embodiment, precision casting to net final dimensions of the upper and lower members 12, 14 means that the precision as-cast dimensional tolerance is between about +/−0.010 inches to about +/−0.020 inches. In another embodiment, precision casting to net final dimensions of the upper and lower members 12, 14 means that the first and second upper connecting surfaces 24, 26 and the first and second lower connecting surfaces 34, 36 have a surface finish roughness of less than about 125 Ra. Although post-casting machining may be performed on other surfaces of the upper and lower members 12, 14 for other reasons, the precision cast to net final dimensions of the first and second upper connecting surfaces 24, 26 and the first and second lower connecting surfaces 34, 36 require no additional post-casting machining in order to friction weld the upper and lower members 12, 14 together.

Assembly of the piston 10 includes joining the precision cast to net final dimension upper member 12 to the precision cast to net final dimension lower member 14 by way of friction welding or inertial welding in which the first and second upper connecting surfaces 24, 26 and the first and second lower connecting surfaces 34, 46 are unmachined prior to the friction welding process. In an embodiment, both the upper and lower members 12, 14 are either rotated such that they rotate in opposing directions about the axial centerline of the piston 10, or one is fixed and the other rotated with respect thereto. As one or more of the upper and lower members 12, 14 are rotated, the members are pushed together such that the first upper connecting surface 24 of the upper member 12 and the first lower connecting surface 34 of the lower member 14 as well as the second upper connecting surface 26 of the upper member 12 and the second lower connecting surface 36 of the lower member 14 contact each other, and additional pressing of the upper and lower members 12, 14 together causes a localized friction weld that integrally joins the upper member 12 to the lower member 14. Upon completion of the friction-welding process, the first upper connecting surface 24 and the first lower connecting surface 34 form a first welded joint 38, and the second upper connecting surface 26 and the second lower connecting surface 36 form a second welded joint 40. As explained above with respect to FIGS. 6-9, in an embodiment, the first welded joint 38 between the first upper and lower connecting surfaces 24, 34 and the second welded joint 40 between the second upper and lower connecting surfaces 26, 36 are substantially coplanar. Also as explained above with respect to FIG. 10, in another embodiment, the first welded joint 38 between the first upper and lower connecting surfaces 24, 34 and the second welded joint 40 between the second upper and lower connecting surfaces 26, 36 are vertically offset and non-coplanar.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A piston for use in an internal combustion engine, said piston comprising:
   an upper member, wherein said upper member is precision cast to net final dimensions, and said upper member includes a crown and a combustion surface extending radially inward from said crown, said upper member further including a first upper connecting surface and a second upper connecting surface, wherein said first and second upper connecting surfaces are concentrically oriented; and
   a lower member, wherein said lower member is precision cast to net final dimensions, said lower member having a pair of opposing skirts, each skirt having a bore formed therethrough, and said lower member further including a first lower connecting surface and a second lower connecting surface, wherein said first and second lower connecting surfaces are concentrically oriented;
   wherein said lower member is integrally connected to said upper member by friction welding such that said first upper connecting surface and said first lower connecting surface form a continuous first welded joint therebetween and said second upper connecting surface and said second lower connecting surface form a continuous second welded joint therebetween,
   wherein in the formation of the foregoing welded joints, the heat which is necessary to raise the temperature of the connecting surfaces to the level required to form a welded joint is solely and exclusively generated by the friction created by the continuous relative rotation between said upper member and said lower member as one of said upper member and said lower member is rotated and other of said upper member and said lower member is fixed, and applying pressure to either or both of the joining surfaces until the welded joint is completed upon which the rotation ceases,
   wherein said upper member and said lower member require no additional post-casting machining in order to friction weld together said upper member and said lower member.

2. The piston of claim 1 further comprising at least one circumferential groove formed into an outer surface of said upper member and at least one circumferential groove formed into an outer surface of said lower member.

3. The piston of claim 1 further comprising at least one integral cooling oil reservoir formed adjacent to said combustion surface when said upper and lower members are friction welded together.

4. The piston of claim 1, wherein said first upper connecting surface is positioned radially inward relative to said second upper connecting surface and said first lower connecting surface is positioned radially inward relative to said second lower connecting surface.

5. The piston of claim 1, wherein said first upper connecting surface and said second upper connecting surface are substantially coplanar, and said first lower connecting surface and said second lower connecting surface are substantially coplanar.

6. The piston of claim 1, wherein said first upper connecting surface is offset relative to said second upper connecting surface, and said first lower connecting surface is offset from said second lower connecting surface.

7. The piston of claim 1, wherein said first and second upper connecting surfaces are substantially parallel with respect to said crown.

8. The piston of claim 1, wherein at least one of said first and second upper connecting surfaces is formed at an angle relative to said crown.

9. The piston of claim 1, wherein said upper and lower members are precision cast to net final dimensions such that said upper and lower members have a cast dimensional tolerance between about +/−0.010 inches to about +/−0.020 inches.

10. The piston of claim 1, wherein said upper and lower members are precision cast to net final dimensions such that said upper and lower members have a surface finish roughness of less than about 125 Ra.

11. A piston for use in an internal combustion engine, said piston comprising:
    an upper member, said upper member being precision cast to net final dimensions, said upper member having a combustion surface and at least two concentrically positioned upper connecting surfaces spaced apart from said combustion surface; and
    a lower member, said lower member being precision cast to net final dimensions, said lower member having a pair of bores formed therethrough for receiving a connecting rod pin, and said lower member having at least two concentrically positioned lower connecting surfaces;
    wherein said lower member is attached to said upper member by way of friction welding such that each upper connecting surface of said upper member forms a continuous welded joint with one of said lower connecting surfaces, wherein in the formation of the foregoing welded joints, the heat which is necessary to raise the temperature of the connecting surfaces to the level required to form a welded joint is solely and exclusively generated by the friction created by the continuous relative rotation between said upper member and said lower member as one of said upper member and said lower member is rotated and other of said upper member and said lower member is fixed, and applying pressure to either or both of the joining surfaces until the welded joint is completed upon which the rotation ceases, wherein said upper member and said lower member require no additional post-casting machining in order to friction weld together said upper member and said lower member.

12. The piston of claim 11, wherein said upper and lower members are precision cast to net final dimensions such that said upper and lower members have a cast dimensional tolerance between about +/−0.010 inches to about +/−0.020 inches.

13. The piston of claim 11, wherein said upper and lower members are precision cast to net final dimensions such that said upper and lower members have a surface finish roughness of less than about 125 Ra.

14. The piston of claim 11, wherein all of said at least two upper connecting surfaces are coplanar relative to each other, and all of said at least two concentrically positioned lower connecting surfaces are coplanar relative to each other.

15. The piston of claim 11, wherein at least one of said at least two upper connecting surfaces is non-coplanar relative to the other of said at least two upper connecting surfaces, and at least one of said at least two lower connecting surfaces is non-coplanar relative to the other of said at least two lower connecting surfaces.

16. The piston of claim 11 further comprising at least one integral cooling oil reservoir formed adjacent to said combustion surface when said upper and lower members are friction welded together.

17. The piston of claim 11 further comprising at least one circumferential groove formed into an outer surface of said upper member and at least one circumferential groove formed into an outer surface of said lower member.

18. A method of manufacturing a piston comprising:

precision casting to net final dimensions an upper member, wherein said upper member includes a combustion surface and at least two upper connecting surfaces concentrically arranged and spaced apart from said combustion surface;

precision casting to net final dimensions a lower member, wherein said lower member includes a pair of opposing skirts having a bore formed through each of said skirts, said lower member also including at least two lower connecting surfaces concentrically arranged; and friction welding said lower member to said upper member, wherein a continuous welded joint is formed between each of said upper connecting surfaces of said upper member and a corresponding lower connecting surface of said lower member, wherein the step of friction welding includes forming a continuous welded joint between said upper connecting surfaces and said lower connecting surfaces which are joined in said process in their precision cast to net dimension form and not machined in any manner prior to the friction welding process, wherein in the formation of the foregoing welded joints, the heat which is necessary to raise the temperature of the connecting surfaces to the level required to form a welded joint is the solely and exclusively generated by the friction created by the continuous relative rotation between said upper member and said lower member as one of said upper member and said lower member is rotated and other of said upper member and said lower member is fixed, and applying pressure to either or both of the joining surfaces until the welded joint is completed upon which the rotation ceases.

19. The method of claim 18, wherein said precision casting to net final dimensions of said upper and lower members provides a cast dimensional tolerance between about +/−0.010 inches to about +/−0.020 inches.

20. The method of claim 18, wherein said precision casting to net final dimensions of said upper and lower member provides a surface finish roughness of less than about 125 Ra.

\* \* \* \* \*